UNITED STATES PATENT OFFICE.

EDUARD ROTT, OF DASSEL, GERMANY.

MANUFACTURE OF ARTIFICIAL STONES, TILES, &c.

SPECIFICATION forming part of Letters Patent No. 693,906, dated February 25, 1902.

Application filed October 19, 1900. Serial No. 33,645. (No specimens.)

*To all whom it may concern:*

Be it known that I, EDUARD ROTT, a subject of the Grand Duke of Baden, residing at Dassel, Germany, have invented certain new and useful Improvements in the Manufacture of Artificial Stones, Tiles, and the Like; and I do hereby declare the following to be a full, clear, and exact description of the invention, such as will enable others skilled in the art to which it appertains to make and use the same.

My invention relates to a process for the manufacture of bricks, tiles, and the like, and has for its object to produce such articles that will not be readily acted upon by water and the atmosphere.

I am aware that artificial-stone compounds have been made in which lime is a constituent (German Patents Nos. 14,195, 20,890, and 103,777) in the form of calcium hydrate or was added as a powder and mixed with sand or silicious minerals performing the same function as sand, such as burnt clay ground fine, the object being to form, if possible, hydrosilicates of lime. The burnt clay is of course dehydrated and will not combine chemically with the lime, and furthermore it cannot be kneaded, so as to form an intimate mixture, the burnt clay or sand acting as a filler and the lime the binding agent, forming hydrosilicate of lime.

Now this invention has for its object the production of articles whose composition will essentially consist of calcium hydro-aluminates, which cannot be obtained by the process mentioned above. Only hydrated alumina possesses the property of uniting with strong bases, in which case it acts as an acid to form with the base an aluminate. However, it is known that aluminates are produced by fusion. By the present process hydro-aluminates are produced by means of high steam-pressure and are as stable against the action of air and water as aluminates produced by fusion.

I mix unburnt or natural clay with cream of lime or, if the nature of the clay requires or permits it, with ground burnt lime free from water, using about thirty per cent. of burnt lime. It is thoroughly mixed and formed and subjected to steam at high pressure in order to produce calcium hydro-aluminates. A mixture of finely-ground burnt lime and naturally-moist clay in the proportions stated gets hot, and when continuously stirred becomes dry and crumbled. The mass can now be stored, and the lime will fully slake in the clay. Before forming by molding or otherwise water is added sufficient to render the mass workable or plastic. The formed articles are then placed in a steam-chamber for from three to ten hours under a pressure of steam of not over thirty atmospheres, by reason of which they are completely hardened and ready for use. Tile-clay can readily be used. With very tough or fat clay milk of lime is used and worked in until a homogeneous mass results, to which may be added dry clay to render the mass stiffer and of the proper consistency for molding. The resulting product, having a fritted appearance, is perfectly stable in air and water, durable, and easy of manufacture.

Having now described my invention, what I declare as new therein, and desire to secure by Letters Patent, is—

1. The process of making artificial-stone compound, which consists in mixing natural clay with cream of lime and subjecting the mixture to steam under pressure, substantially as described.

2. The process of making artificial-stone compound, which consists in mixing fat clay with milk of lime and subjecting the mixture to steam under pressure, substantially as described.

3. The process of making artificial-stone compound, which consists in mixing clay, lime and water to a dough, subjecting the mixture to steam under pressure of not over twenty-five atmospheres, substantially as described.

4. The process of making artificial-stone compound, which consists in mixing clay with thirty per cent. of lime and then adding water to form a dough and subjecting the mixture to steam under pressure of not over twenty-five atmospheres in a closed vessel, substantially as described.

In testimony whereof I affix my signature in presence of two witnesses.

EDUARD ROTT.

Witnesses:
  AD. SIEVERT,
  LEONORE KASCH.